W. HARRIS.
Stereoscopic Cameras.
No. 151,972. Patented June 16, 1874.
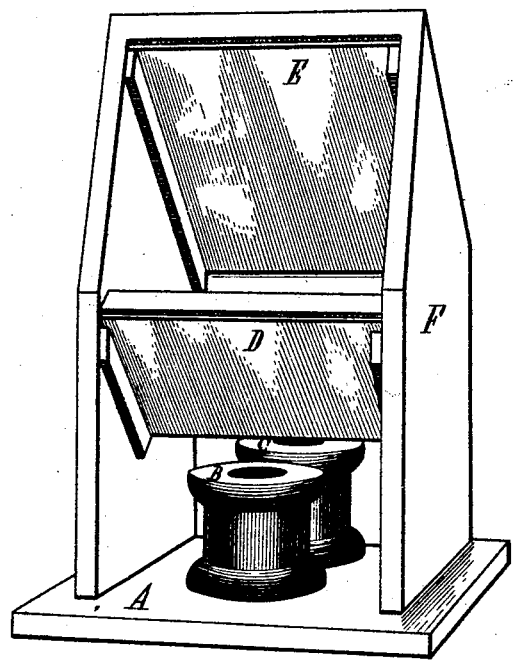
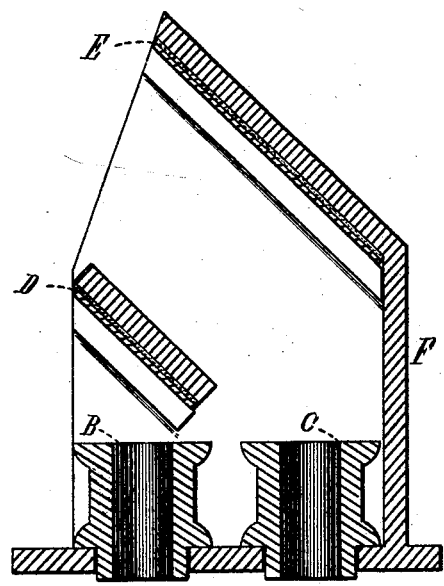
Witnesses,
Inventor,
Warren Harris

UNITED STATES PATENT OFFICE.

WARREN HARRIS, OF DANVILLE, VERMONT.

IMPROVEMENT IN STEREOSCOPIC CAMERAS.

Specification forming part of Letters Patent No. 151,972, dated June 16, 1874; application filed February 3, 1874.

CASE B.

*To all whom it may concern:*

Be it known that I, WARREN HARRIS, of Danville, in the county of Caledonia and State of Vermont, have invented a certain Improvement in Stereoscopic Cameras, of which the following is a specification:

The object of my invention is to take positive and negative stereoscopic portraits and views which shall not require transposition, by the combination of two reflectors with the two object-glasses of a stereoscopic camera in such a manner as to cause the light to form each of the two images without lateral inversion, (when viewed from the side next the lens,) and without causing the rays which form one image to cross those which form the other after reflection.

Figure 1 is a perspective view. Fig. 2 is a vertical section.

A is the front board of an ordinary stereoscopic camera, with the object-glasses B C in their usual positions. D is a reflector, close in front of the object-glass B, at an angle of forty-five degrees with the sensitive plate. E is a larger reflector, in front of the object-glass C, also at an angle of forty-five degrees with the sensitive plate, and two and a half or three inches farther from the sensitive plate than the reflector D. The two reflectors are fixed in the box or hood F, which can be attached to or detached from the front board; or they may be fixed in separate hoods, which are attached to the front board, or to the lens-tubes.

The reflectors may be varied slightly from the angle of forty-five degrees, so as to increase or diminish the distance between the two pictures.

The camera is placed with the sensitive plate parallel with the principal ray. The light from the object which strikes the two reflectors is reflected through the two object-glasses, forming both of the images without lateral inversion.

Reflecting the light which forms both of the images, as above described, is equivalent to turning over laterally in its own place each of the two pictures, or to transposing them.

Since the light which forms one picture travels five or six inches farther than the light which forms the other, in taking portraits one lens should be of longer focus than the other. If the image be one-twelfth the size of the object, one object-glass should be one-half inch longer focus; if one-twenty-fourth, one-fourth inch; if one-forty-eighth, one-eighth inch, &c.

The focus of an object-glass may be lengthened by using a slightly concave lens between the two lenses.

In taking negatives the film should be turned away from the lenses.

I claim as my invention—

The combination of one object-glass, having a reflector close in front of it, with another object-glass, having a larger reflector, two and one-half inches or more farther from the lens in front than the other, substantially as described, for the purpose of obviating the necessity for transposition.

WARREN HARRIS.

Witnesses:
RUFUS AMES,
EMERSON GUE.